W. C. KORTHALS-ALTES.
MOTOR CONTROL SYSTEM.
APPLICATION FILED MAR. 16, 1918.
1,279,360.
Patented Sept. 17, 1918.
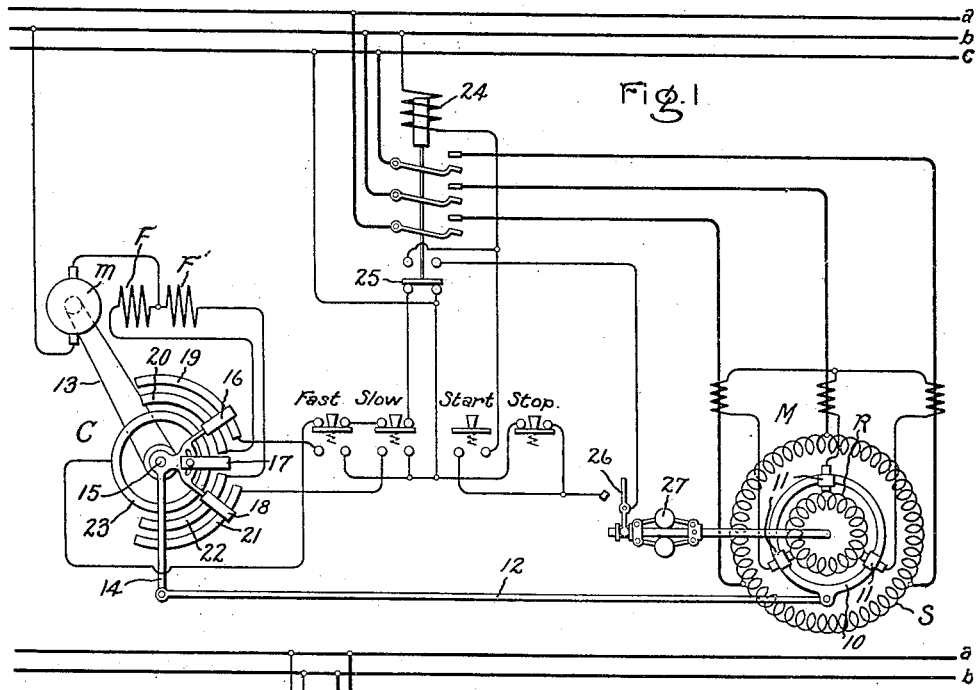
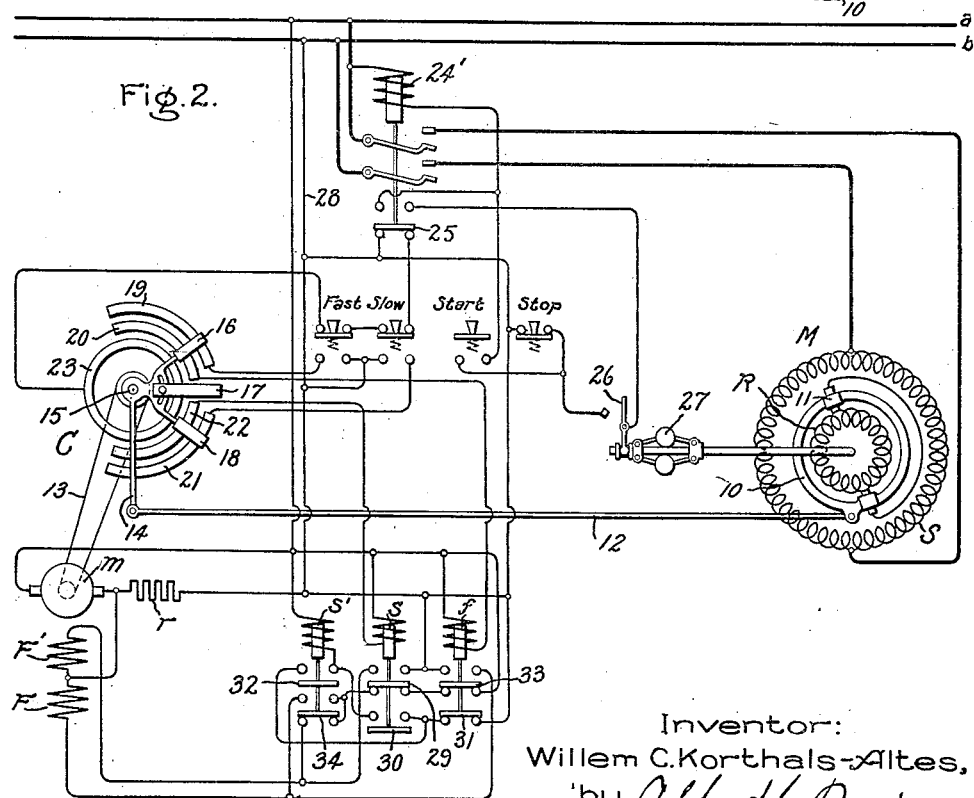
Inventor:
Willem C. Korthals-Altes,
by
His Attorney.

UNITED STATES PATENT OFFICE.

WILLEM C. KORTHALS-ALTES, OF SCHENECTADY, NEW YORK, ASSIGNOR TO GENERAL ELECTRIC COMPANY, A CORPORATION OF NEW YORK.

MOTOR-CONTROL SYSTEM.

1,279,360.  Specification of Letters Patent.  Patented Sept. 17, 1918.

Application filed March 16, 1918. Serial No. 222,804.

*To all whom it may concern:*

Be it known that I, WILLEM C. KORTHALS-ALTES, a subject of the Queen of the Netherlands, residing at Schenectady, county of Schenectady, State of New York, have invented certain new and useful Improvements in Motor-Control Systems, of which the following is a specification.

My invention relates to the control of electric motors and has for its object the provision of improved means whereby an electric motor may be started, stopped and generally controlled in a reliable, simple and efficient manner.

My invention relates more specifically to the control of electric motors wherein the speed of the motor is varied by a motor driven controller under the control of manually operated switches. One particular application to which my invention is well adapted is that of an alternating current commutator motor in which the speed is varied by shifting the brushes. It is desirable that these motors be controlled by manually operated switches such, for instance, as push buttons, one of which is provided to start the motor, one to speed it up and another to slow down the motor. It is also desirable that when the motor is started the control shall be in a condition to give normal speed, that is, in the case of a brush shifting motor, for instance, the brushes shall be in their neutral position. It is also important that the motor shall be disconnected from the line when the speed is below a predetermined value so as to prevent it being stalled by an overload and left standing with the power on the motor.

In carrying out my invention, I provide means whereby the above objects are obtained in a very simple manner. I use a pilot motor for varying the speed of the main motor and provide means whereby the pilot motor is promptly brought to rest by a dynamic braking action, thereby rendering the controller accurate and positive. In the accompanying drawing illustrating my invention Figure 1 is a diagrammatic view showing one form in which my invention may be applied to a brush shifting motor, and Fig. 2 shows a similar control embodying certain additional features.

Referring first to Fig. 1, M represents the main motor to be controlled. For purposes of illustration I have shown this motor as of the brush shifting type, the stator being indicated at S and the rotor at R. I have simply shown the parts in a conventional way, the brush rigging being really shown as a ring 10 carrying brushes 11, the ring being adapted to be rotated through the rod 12. For shifting the brushes I provide a pilot motor m connected to drive a circuit controller C through a belt 13. Attached to the moving element of the controller C is an arm 14 which is pivoted to the rod 12, so that as the pilot motor rotates and turns the controller C, it will also shift the brushes of the motor M. The pilot motor m is made reversible by providing two field windings F and F', one of which is energized in series with the motor armature for each direction of rotation. The rotating element of the controller C, which is pivoted at 15, comprises three contact arms 16, 17 and 18. The arm 16 engages segments 19 and 20 and the arm 18 engages segments 21 and 22. In the neutral position of the controller, which is the position shown in the drawing, the contact arm 17 engages only contact ring 23 but when the controller is moved in either direction to near its limit, the arm will engage either the segments 20 or 22, depending upon the direction in which the controller is moved. The electromagnetic switch 24, I have shown as of the triple-pole type, since the motor is a three-phase motor connected to three-phase mains. This switch is adapted to close the stator circuit of the motor and is also provided with an interlock contact 25 for purposes hereinafter described. I also provide a switch 26 which is only closed when the main motor is at or above a predetermined speed. For purposes of illustration I have shown this switch as being operated by a fly-ball governor 27. Four push button switches are provided, one a normally open switch for starting the motor, one for operating the pilot motor to slow down the main motor, a third switch for operating the pilot motor to speed up the main motor and a fourth normally closed switch for stopping the main motor.

As thus constructed and arranged, the operation of my control system is as follows: To start the motor the push button switch marked "Start" is closed thereby energizing the winding of the line switch 24, from main b, through the contacts of the switch and the contacts of the "stop"

push button back to line c. When the switch 24 closes it energizes the stator winding of the motor and closes interlocking contact 25. This interlock is ineffective, however, until the motor arrives at a predetermined speed so as to close the switch 26. In starting, therefore, the operator must keep the "start" button closed until the motor arrives at the predetermined speed. This switch may, therefore, be used for "jogging" the motor. When the motor reaches a suitable speed the switch 26 is closed and a maintaining circuit for the switch 24 is made through the interlock 25, switch 26 and the "stop" button, this circuit being independent of the "start" button. The operator may now, therefore, release the "start" button, and the motor will run at its normal speed. If, however, it is desired to slow down the motor the "slow" button is pressed, thereby energizing the pilot motor as follows: from the line c through the contacts of the "slow" button, segment 21, contact arm 18, segment 22, field winding F′ and armature of the motor m to line b. The motor will, therefore, now rotate the controller C, and also shift the brushes of the motor M in a direction to reduce its speed. If the operator maintains the "slow" button closed, the controller will continue to move and shift the brushes until the contact arm 18 passes off of the segments 21 and 22, whereupon the pilot motor will be stopped. When the contact 18 moves off of the segments 21 and 22, the arm 17 moves onto the segment 20 thereby initiating a circuit through the field winding F which will be closed when the line switch 24 opens. This circuit is from the line c through the interlock 25, back contacts on the "slow" push button, back contacts on the "fast" push button, contact ring 23, contact arm 17, segment 20, field winding F and armature of the pilot motor to line b. This circuit will not, however, be completed until the line switch 24 opens, the object of this arrangement being to move the controller back to neutral position whenever the line switch opens, so that the main motor will always start with the brushes in the neutral position. Likewise, if the "fast" button is pressed, the field winding F will be energized to energize the pilot motor for operation in a direction to increase the speed of the main motor, and upon the release of the push button the circuit will be made which will be completed when the line switch opens and turn the controller back to neutral. If the motor should become overloaded so as to materially reduce its speed, the switch 26 will open, so as to open the line switch 24 and stop the motor and also turn the controller C back to neutral. At any time, however, the motor may be stopped by pressing the "stop" button.

In Fig. 2 I have shown a similar arrangement in which, however, there are some additional features prominent among which is the dynamic braking of the pilot motor. In this case instead of controlling the pilot motor through the controller C directly, I control it through electromagnetic switches. When the "start" button in this form of my invention is closed a circuit is established from the line a through the winding of the line switch 24′, through contacts of the "start" button, contacts of the "stop" button, and back to line as before. To slow down the motor the "slow" button is pressed and a circuit established from the line b, conductor 28 through the contacts of the "slow" button, segments 21 and 22 to the winding of the electromagnetic switch s, and back to line. This switch s is provided with a contact 30, so that when the switch closes, a second switch s′ will be closed, the energizing circuit being from line a through the winding of the switch s′, through the contact 30 of switch s, thence through contact 31 of switch f and back to line. The switches s and s′ being now both closed, the pilot motor m will be energized from the line a through the armature of the motor, through the field winding F′, thence through the contact 29 of switch s, and back to line. The motor will now operate in a direction to shift the main motor M to reduce the speed, and if the operator continues to press the "slow" button the brushes will be shifted their maximum travel at which point the contact 18 will leave the segment 21, the contact 17 in the meantime moving onto the segment 20. The pilot motor will now be deënergized and the controller C will be in a position to reverse the motor and return the controller to its neutral position in case the contactor 24′ opens, all as described in connection with Fig. 1. When the operator releases the "slow" button, or when the contact 18 passes off segment 21 a dynamic braking circuit is established which stops the pilot motor. It will be noted that when the switch s′ closes, it makes a maintaining circuit for its winding through contact 32 and contact 31 of switch f, so that the opening of the switch s does not cause the opening of the switch s′. A dynamic braking circuit of the motor m will, therefore, be completed from the left hand brush of the pilot motor through the contact 33 on the switch f, contact 29 on the switch s, contact 34 of switch s′ which is now up, field winding F and back to the motor armature. This dynamic braking circuit will bring the motor to rest promptly. If, on the other hand, it is desired to speed up the motor the "fast" button is pressed, thereby establishing the circuit through the line b, segments 19 and 20 to winding of switch f and back to line. The switch f will, therefore, close and complete a circuit for the pilot motor from the line *a* through the motor armature, through the field F and through the contact 33 of switch *f* back to line. The pilot motor will now operate as above described to shift the brushes and turn the controller to finally stop the pilot motor and also make the connections for returning the pilot motor to neutral position upon the opening of the line contact 24'. Upon the release of the "fast" button, the dynamic braking circuit will be established from the left hand brush of the pilot motor, through contacts 33 of switch *f*, through contact 29 of switch *s*, through contact 34 of switch *s'*, which is now open, and through the field winding F' to the motor armature. It will be noted that in the dynamic braking in one direction the switch *s'* is opened, and in the other direction it is closed, thereby simplifying the dynamic braking connections. It will also be noted that the motor *m* is at all times connected to line but during stopping and while the motor is at rest, this connection is through the high resistance *r* to initiate the self excitation but the current flowing into the motor will be negligible. A speed controlled switch 26 is also employed in the same way and for the same purpose as in Fig. 1 and need not, therefore, be further described.

While I have described my invention as embodied in concrete form and as operating in a specific manner in accordance with the provisions of the patent statutes, it should be understood that I do not limit my invention thereto, since various modifications thereof will suggest themselves to those skilled in the art, without departing from the spirit of my invention the scope of which is set forth in the annexed claims.

What I claim as new and desire to secure by Letters Patent of the United States, is:—

1. The combination with an electric motor of means for controlling the same comprising a controller, a pilot motor for operating the same in two directions from a neutral position to either accelerate or slow down the motor, manually operated normally inoperative switches, one for varying the speed of the motor in each direction, and means whereby when the pilot motor has varied its speed a predetermined amount it is automatically stopped by dynamic braking.

2. The combination with an electric motor of means for controlling the same comprising a controller, a pilot motor for operating the same in two directions from a neutral position to either accelerate or slow down the motor, a manually operated switch for starting the motor independently of the controller, and means whereby when the motor speed increases to a predetermined value the said manually operated switch is rendered ineffective to control the motor.

3. The combination with an electric motor of means for controlling the same comprising a controller, a pilot motor for operating the same in two directions from a neutral position to either accelerate or slow down the motor, a manually operated switch for starting the motor independently of the controller, and means whereby when the motor speed decreases to a predetermined value the motor is stopped independently of the motor operated switch.

4. The combination with an electric motor, of means for controlling the same comprising a controller, a pilot motor for operating the same in two directions from a neutral position to accelerate and slow down the motor, manually operated normally inoperative switches, one for varying the speed of the motor in each direction, means whereby upon the release of either of said speed varying switches from operative position connections are established for returning the controller to neutral position upon the opening of the motor circuit, and a dynamic braking circuit for the pilot motor established upon the release of either of said switches.

5. The combination with an electric motor of means for controlling the same comprising a controller automatically operated in two directions from a neutral position to accelerate and slow down the motor respectively, a manually operated switch normally in inoperative position for starting the motor, means whereby when the motor reaches a predetermined speed the motor circuit is held closed independently of said switch, manually operated normally inoperative switches, one for varying the speed of the motor in each direction and means whereby upon the release of either of said speed varying switches from operative position, connections are established for returning the controller to neutral position upon the opening of the circuit of the motor or the reduction of its speed below said predetermined speed.

6. The combination with an electric motor of means for varying its speed comprising a pilot motor connected to shift the brushes of said motor in two directions from neutral, a manually operated switch for starting the motor independently of the controller, manually operated normally inoperative switches, one for effecting the movement of the brushes in each direction to accelerate and slow down the motor respectively, and means whereby upon the release of either of said speed varying switches from operative position connections are established for returning the controller to neutral position upon the opening of the motor circuit.

7. The combination with an electric motor of means for controlling the same comprising a controller automatically operated in two directions from a neutral position to accelerate and slow down the motor respectively, a manually operated switch for starting the motor independently of the controller, manually operated switches, one for effecting the operation of the controller through a predetermined range in each direction and means whereby upon the release of either of said switches from operative position connections are established for returning the controller to neutral position upon the opening of the motor circuit.

In witness whereof, I have hereunto set my hand this 14th day of March, 1918.

WILLEM C. KORTHALS-ALTES.